(No Model.)

R. WEATHERBURN.
METALLIC PACKING.

No. 403,808. Patented May 21 1889.

Witnesses:
Will T. Norton
Chas. Rhodes.

Inventor:
Robert Weatherburn
by John J. Halsted
his Attys.

UNITED STATES PATENT OFFICE.

ROBERT WEATHERBURN, OF LONDON, ENGLAND, ASSIGNOR TO THOMAS HULBURD, OF SAME PLACE.

METALLIC PACKING.

SPECIFICATION forming part of Letters Patent No. 403,808, dated May 21, 1889.

Application filed December 11, 1888. Serial No. 293,314. (No model.) Patented in England February 20, 1888, No. 2,524.

*To all whom it may concern:*

Be it known that I, ROBERT WEATHERBURN, a subject of the Queen of Great Britain, residing at London, England, have invented new and useful Improvements in and Relating to Metallic Packings, (patented in Great Britain February 20, 1888, No. 2,524,) of which the following is a specification.

The invention relates to packing of that class in which one or more rings of soft metal or composition is or are arranged between oppositely-inclined surfaces (the ends of the ring or rings being correspondingly inclined or beveled) in such a manner that when the distance between the said surfaces is decreased the metal of which the ring or rings is or are composed will be forced or wedged more or less tightly into contact with the rod or surface against which the packing is placed.

In packing of this class as heretofore constructed the rings (with the exception of the inclined or beveled portions at the ends) are of the same thickness throughout or parallel, so that when the gland is screwed down to tighten the packing only the portions of the rings adjacent to the inclined surfaces are acted upon by the latter, thus causing the said rings to wear unevenly and more rapidly than if the rings were moved into contact with the rods throughout their whole length.

The chief object of my present invention is to obviate these defects, and to this end it comprises improvements as hereinafter described.

Figure 1:
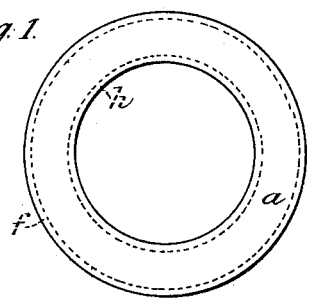
Figure 2:
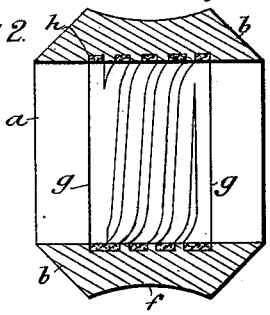
Figure 3:
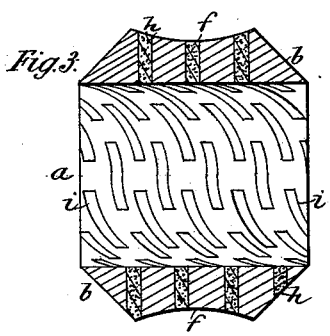
Figure 4:
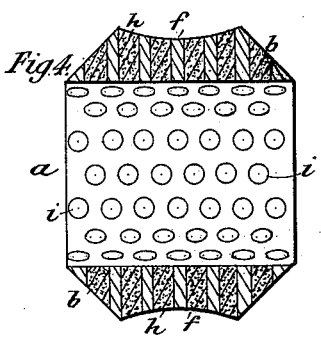
Figure 5:
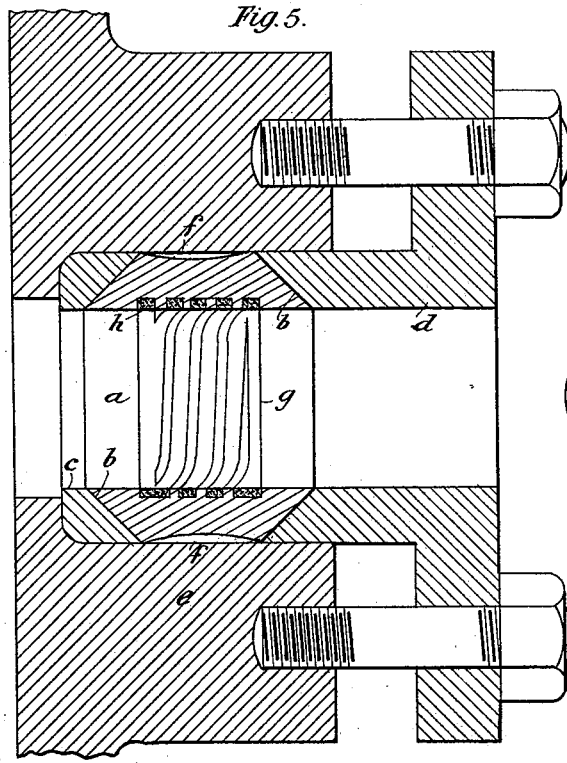
Figure 6:
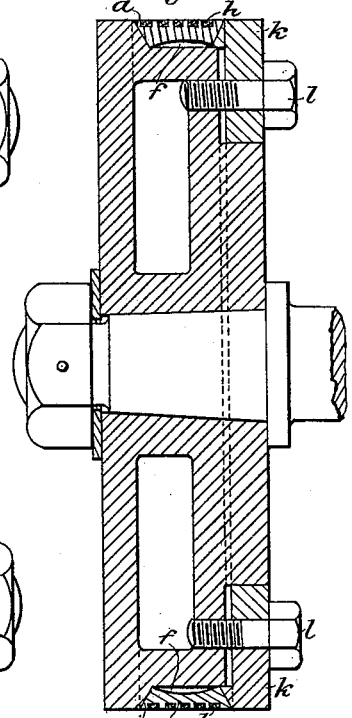

In the accompanying drawings, Figure 1 is an end view of a packing-ring constructed according to the said invention, and Fig. 2 is a longitudinal section of the same. Figs. 3 and 4 are views similar to Fig. 2, illustrating different modifications. Fig. 5 is a sectional view showing a packing-ring in connection with a stuffing-box and gland. Fig. 6 is a sectional view showing the application of the packing to a piston.

$a$ represents a ring of the improved packing, the ends of which are inclined, as shown at $b$ $b$, and which are adapted to work in conjunction with the oppositely-inclined surfaces of the junk-ring $c$ and the gland $d$ in the stuffing-box $e$, as shown in Fig. 5.

$f$ is a concave recess formed in the rear face of the packing—that is to say, the face opposite to the working-face—in order to weaken the ring at the center, so that the screwing up of the gland not only forces or wedges the packing into close contact with the rod or surface at the ends, but also tends to bulge the portion of the packing between the said ends in such a manner that it is pressed against the rod or surface.

In order to reduce the wear of the rings as much as possible, I sometimes form in the wearing-surfaces channels or grooves $g$, which I fill with asbestus, $h$, or anti-friction material, the said channels or grooves being advantageously arranged in a helical direction, as shown in Fig. 2, so that the anti-friction material is gradually compressed toward the extremities of the channels or grooves during the to-and-fro motion of the rod; also, I sometimes form holes or recesses $i$ in the said rings, as in Figs. 3 and 4, the said holes being either of the shape shown or of any other convenient shape.

I sometimes modify the form of the packing to adapt the same for use with pistons, as shown in Fig. 6. In this modification the recess $f$ is formed on the inner side of the ring, and the piston-head is provided with an inclined surface, $j$, and with a loose ring, $k$, having an oppositely-inclined surface, so that by tightening the screws $l$ $l$ the packing can be tightened against the surface of the cylinder. Any other convenient means may, however, be employed for compressing the packing.

When two or more rings of packing are employed in combination, I generally place between each two adjacent packing-rings a ring of brass or other suitable material of triangular shape in transverse section, which ring serves the same purpose as the junk-ring hereinbefore referred to.

Having now particularly described and ascertained the nature of the said invention and in what manner the same is to be performed, I declare that what I claim is—

1. A metallic packing having beveled or inclined edges, as set forth, diverging from a hollow or concave recess in that side which is opposite its working-face, substantially as set forth, and whereby it is adapted to be compressed between two oppositely-inclined surfaces.

2. A metallic packing having the described hollow or concave recess in its side which is opposite its working-face and having the inclined or beveled ends diverging from said recess, as set forth, and also provided with the described series of holes or recesses filled with asbestus or anti-friction material.

ROBERT WEATHERBURN.

Witnesses:
G. F. REDFERN,
JOHN E. BOUSFIELD.